(12) United States Patent
Matsumura et al.

(10) Patent No.: US 12,185,386 B2
(45) Date of Patent: Dec. 31, 2024

(54) TERMINAL, RADIO COMMUNICATION METHOD, BASE STATION, AND SYSTEM FOR CONTROLLING TRANSMISSION OF PHASE TRACKING REFERENCE SIGNAL

(71) Applicant: NTT DOCOMO, INC., Tokyo (JP)

(72) Inventors: Yuki Matsumura, Tokyo (JP); Satoshi Nagata, Tokyo (JP); Lihui Wang, Beijing (CN); Xiaolin Hou, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 301 days.

(21) Appl. No.: 17/617,496

(22) PCT Filed: Jun. 12, 2019

(86) PCT No.: PCT/JP2019/023371
§ 371 (c)(1),
(2) Date: Dec. 8, 2021

(87) PCT Pub. No.: WO2020/250360
PCT Pub. Date: Dec. 17, 2020

(65) Prior Publication Data
US 2022/0232643 A1 Jul. 21, 2022

(51) Int. Cl.
*H04W 74/0833* (2024.01)
*H04L 5/00* (2006.01)
(Continued)

(52) U.S. Cl.
CPC ....... *H04W 74/0841* (2013.01); *H04L 5/0051* (2013.01); *H04W 72/1263* (2013.01);
(Continued)

(58) Field of Classification Search
CPC ......... H04W 74/0841; H04W 72/1263; H04W 72/23; H04W 74/006; H04W 74/0866; H04W 74/0833; H04W 28/04; H04W 72/1268; H04W 72/21; H04L 5/0051; H04L 5/0048; H04L 5/0044; H04L 5/0053
See application file for complete search history.

(56) References Cited

U.S. PATENT DOCUMENTS

2018/0091350 A1* 3/2018 Akkarakaran .... H04L 27/26134
2018/0242367 A1* 8/2018 Kim ...................... H04W 72/23
(Continued)

OTHER PUBLICATIONS

Office Action issued in Japanese Application No. 2021-525489, dated Jul. 18, 2023 (6 pages).
(Continued)

*Primary Examiner* — Kiet Tang
(74) *Attorney, Agent, or Firm* — Osha Bergman Watanabe & Burton LLP

(57) ABSTRACT

One aspect of a terminal according to the present disclosure includes a receiving section that receives a response signal corresponding to a random access preamble transmitted based on a downlink control channel, and a control section that performs control so that, in a case of transmitting an uplink shared channel, based on the response signal, whether or not to transmit a phase tracking reference signal (PTRS) in initial transmission and whether or not to transmit the PTRS in retransmission are common.

4 Claims, 12 Drawing Sheets

(51) Int. Cl.
  *H04W 72/1263* (2023.01)
  *H04W 72/23* (2023.01)
  *H04W 74/00* (2009.01)
  *H04W 74/08* (2009.01)

(52) U.S. Cl.
  CPC ......... *H04W 72/23* (2023.01); *H04W 74/006* (2013.01); *H04W 74/0866* (2013.01)

(56) References Cited

U.S. PATENT DOCUMENTS

2019/0166615 A1* 5/2019 Nimbalker ............ H04W 72/21
2020/0154410 A1* 5/2020 Suzuki ................. H04W 72/23

OTHER PUBLICATIONS

Extended European Search Report issued in counterpart European Patent Application No. 19933175.2, mailed on Dec. 8, 2022 (8 pages).
Vivo; "Draft CR on PTRS port determination"; 3GPP TSG-RAN WG1 Meeting #95, R1-1812286; Spokane, USA; Nov. 12-16, 2018 (3 pages).
International Search Report issued in PCT/JP2019/023371 on Dec. 17, 2019 (2 pages).
Written Opinion of the International Searching Authority issued in PCT/JP2019/023371 on Dec. 17, 2019 (3 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).
Office Action issued in Indian Application No. 202117057135, dated Sep. 13, 2023 (6 pages).
Office Action issued in Korean Application No. 10-2021-7042087, dated Oct. 16, 2024 (11 pages).
Ericsson; "Summary of 7.1.6 Maintenance for URLLC"; 3GPP TSG RAN WG1 Meeting #94, R1-1809784; Göteborg, Sweden; Aug. 20-24, 2018 (34 pages).
Qualcomm Incorporated; "Summary for Rel-15 DL/UL data scheduling and HARQ Procedure"; 3GPP TSG-RAG WG1 Meeting #94bis, R1-1811854; Chengdu, China; Oct. 8-12, 2018 (39 pages).

* cited by examiner

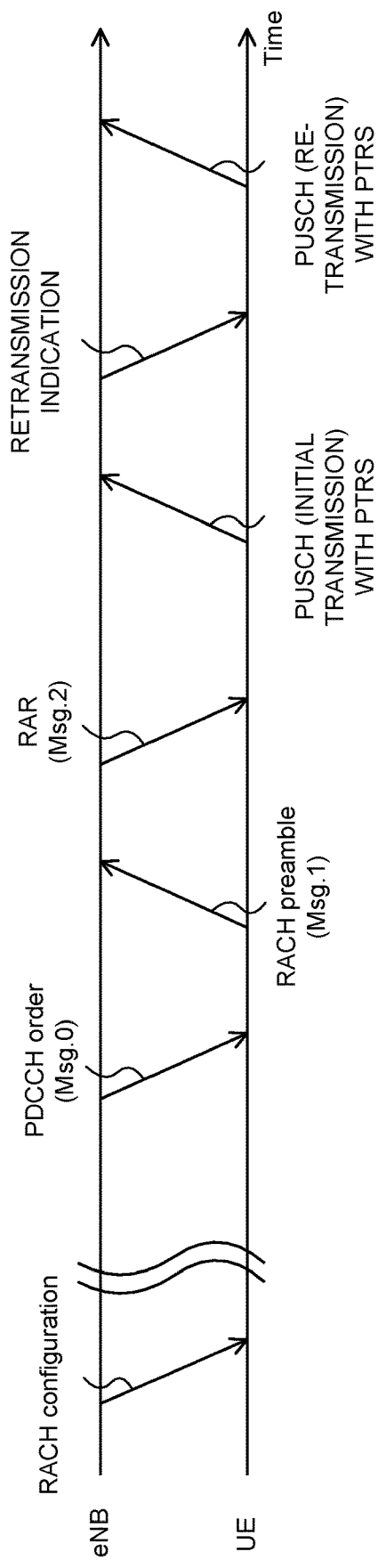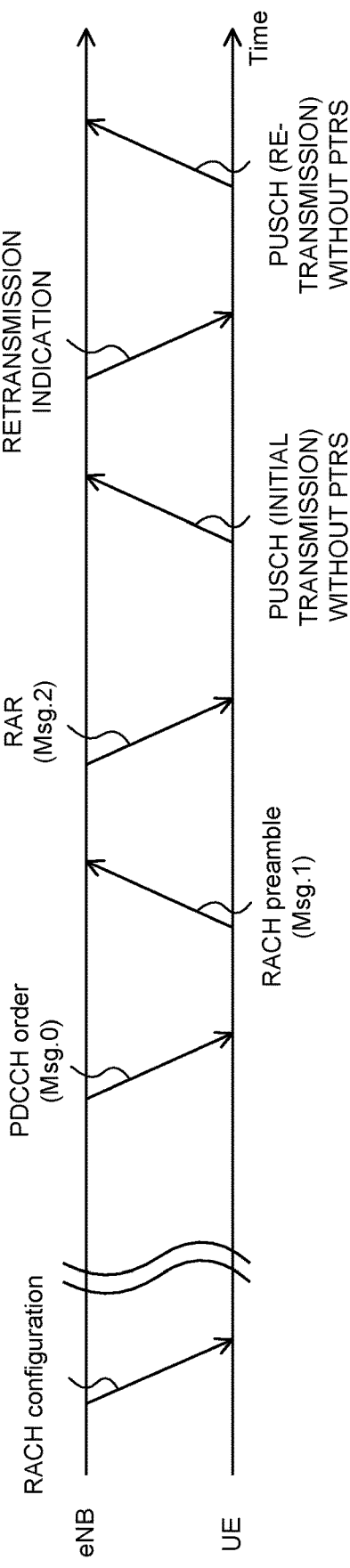

| MCS Index $I_{MCS}$ | Modulation Order $Q_m$ | Target code Rate R x 1024 | Spectral efficiency |
|---|---|---|---|
| 0 | q | 240/ q | 0.2344 |
| 1 | q | 314/ q | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 466 | 2.7305 |
| 18 | 6 | 517 | 3.0293 |
| 19 | 6 | 567 | 3.3223 |
| 20 | 6 | 616 | 3.6094 |
| 21 | 6 | 666 | 3.9023 |
| 22 | 6 | 719 | 4.2129 |
| 23 | 6 | 772 | 4.5234 |
| 24 | 6 | 822 | 4.8164 |
| 25 | 6 | 873 | 5.1152 |
| 26 | 6 | 910 | 5.3320 |
| 27 | 6 | 948 | 5.5547 |
| 28 | 1 | reserved | |
| 29 | 2 | reserved | |
| 30 | 4 | reserved | |
| 31 | 6 | reserved | |

FIG. 6

TERMINAL, RADIO COMMUNICATION METHOD, BASE STATION, AND SYSTEM FOR CONTROLLING TRANSMISSION OF PHASE TRACKING REFERENCE SIGNAL

TECHNICAL FIELD

The present disclosure relates to a terminal and a radio communication method in next-generation mobile communication systems.

BACKGROUND ART

In a Universal Mobile Telecommunications System (UMTS) network, the specifications of Long-Term Evolution (LTE) have been drafted for the purpose of further increasing high speed data rates, providing lower latency and so on (see Non-Patent Literature 1). In addition, for the purpose of further high capacity, advancement and the like of the LTE (Third Generation Partnership Project (3GPP) Release (Rel.) 8 and Rel. 9), the specifications of LTE-Advanced (3GPP Rel. 10 to Rel. 14) have been drafted.

Successor systems of LTE (e.g., referred to as "5th generation mobile communication system (5G)," "5G+ (plus)," "New Radio (NR)," "3GPP Rel. 15 (or later versions)," and so on) are also under study.

In the existing LTE systems (e.g., 3GPP, Rel. 8 to Rel. 14), a user terminal (UE (User Equipment)) controls the reception of a downlink shared channel (e.g., PDSCH (Physical Downlink Shared Channel)) on the basis of downlink control information (also referred to as DCI (Downlink Control Information), DL assignment, and so on) from the base station. The user terminal also controls the transmission of an uplink shared channel (e.g., PUSCH (Physical Uplink Shared Channel)) on the basis of DCI (also referred to as a UL grant and the like).

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

For future radio communication systems (e.g., NR), transmitting a phase tracking reference signal (PTRS) in UL and DL is under study. For example, when transmitting an uplink shared channel (e.g., a PUSCH), the UE controls the transmission of the PTRS on the basis of the configurations from a network (e.g., the base station).

Further, random access procedures are supported in NR. In a random access procedure, when a response signal transmitted in relation to a random access preamble includes a UL transmission indication (e.g., a UL grant), the UE transmits a PUSCH on the basis of the UL grant. Also, in a case where the transmission of the PUSCH has failed, retransmission of the PUSCH is expected. However, how to control the transmission of a PTRS in such a case has not been studied sufficiently.

Thus, one of the objects of the present disclosure is to provide a terminal and a radio communication method that can appropriately transmit a phase tracking reference signal (PTRS).

Solution to Problem

A terminal according to one aspect of the present disclosure includes a receiving section that receives a response signal corresponding to a random access preamble transmitted based on a downlink control channel, and a control section that performs control so that, in a case of transmitting an uplink shared channel, based on the response signal, whether or not to transmit a phase tracking reference signal (PTRS) in initial transmission and whether or not to transmit the PTRS in retransmission are common.

Advantageous Effects of Invention

According to one aspect of the present disclosure, a phase tracking reference signal (PTRS) can be transmitted appropriately.

BRIEF DESCRIPTION OF DRAWINGS

FIGS. 4A and 4B are each a diagram to show an example of transmission control for a PUSCH according to a first aspect;

FIG. 6 is a diagram to show an example of an MCS table;

DESCRIPTION OF EMBODIMENTS

<Random Access Procedure>

The existing LTE systems (e.g., LTE Rel. 8 to Rel. 13) support random access procedures for establishing UL synchronization. The random access procedures include contention-based random access (also referred to as CBRA and the like) and non-contention-based random access (Non-CBRA, also referred to as contention-free random access (CFRA) and the like).

In a contention-based random access (CBRA), a terminal (also referred to as a user terminal or UE, hereinafter) transmits a preamble selected randomly from a plurality of preambles defined for each cell (also referred to as random access preamble, random access channel (Physical Random Access Channel (PRACH)), RACH preamble, and so on). The contention-based random access is a UE-initiated random access procedure, and can be used, for example, at the time of initial access, at the time of initiating or resuming UL transmission, and the like.

In the non-contention-based random access (Non-CBRA, CFRA), on the other hand, the base station assigns a preamble in a UE-specific manner by means of a downlink (DL) control channel (PDCCH), and the UE transmits the preamble assigned by the base station. The non-contention-based random access is a network-initiated random access procedure, and can be used, for example, at the time of handover, at the time of initiating or resuming DL transmission (at the time of initiating or resuming the transmission of DL retransmission indication information in UL), and the like.

Figure 1:
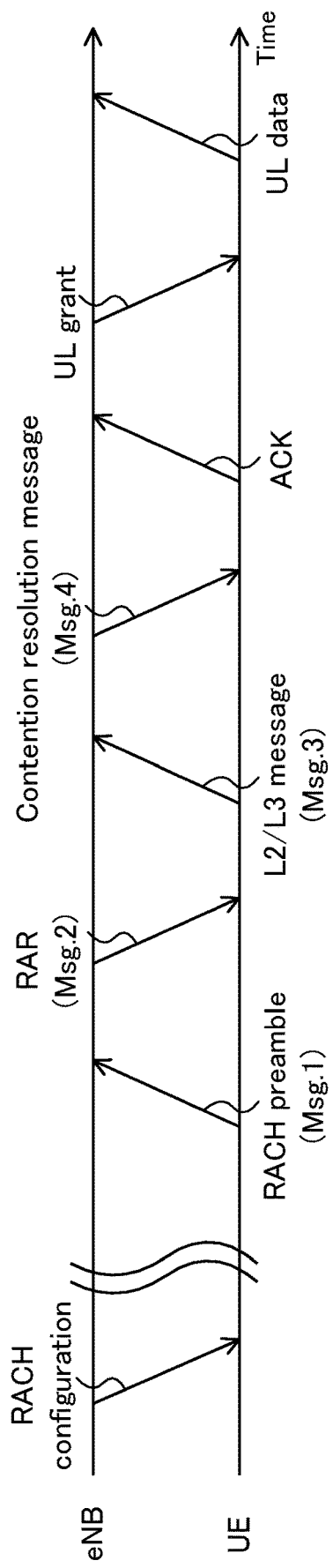
FIG. 1 is a diagram to show an example of a contention-based random access procedure.

FIG. 1 is a diagram to show an example of the contention-based random access. In FIG. 1, the UE receives, beforehand, information (PRACH configuration information) indicating a configuration of a random access channel (PRACH) (PRACH configuration, RACH configuration) through system information (e.g., MIB (Master Information Block) and/or SIB (System Information Block)) or higher layer signaling (e.g., RRC (Radio Resource Control) signaling).

The PRACH configuration information can indicate, for example, a plurality of preambles (e.g., preamble formats) defined for each cell, offsets (prach-FrequencyOffset) indicating the starting positions of time resources (e.g., system frame numbers, subframe numbers) and frequency resources (e.g., six resource blocks (PRBs (Physical Resource Blocks)) used in the PRACH transmission, and the like.

As shown in FIG. 1, when the UE transitions from an idle (RRC_IDLE) state to an RRC-connected (RRC_CONNECTED) state (e.g., at the time of initial access), or when the UE is in the RRC-connected state but UL synchronization is not established (e.g., when initiating or resuming UL transmission), the UE randomly selects one of the plurality of preambles indicated by the PRACH configuration information, and transmits the selected preamble on the PRACH (message 1).

Upon detection of the preamble, the base station transmits a random access response (RAR) as a response (message 2). If the UE fails to receive the RAR within a certain time period (RAR window) after transmitting the preamble, the UE increases transmission power of the PRACH and resends (retransmits) the preamble. Note that increasing the transmission power at the time of retransmission is also called power ramping.

The UE, after receiving the RAR, adjusts the transmission timing of UL on the basis of a timing advance (TA) included in the RAR, and establishes UL synchronization. The UE also transmits a higher layer (L2/L3: Layer 2/Layer 3) control message with a UL resource specified by a UL grant included in the RAR (message 3). This control message includes a UE identifier (UE-ID). The UE identifier may be, for example, C-RNTI (Cell-Radio Network Temporary Identifier) in a case of being in the RRC-connected state, or a higher layer UE-ID such as S-TMSI (System Architecture Evolution-Temporary Mobile Subscriber Identity) when in the idle state.

The base station transmits a contention resolution message in response to the higher layer control message (message 4). The contention resolution message is transmitted on the basis of the UE identifier included in the control message. The UE, which successfully detected the contention resolution message, transmits an acknowledge (ACK) in a HARQ (Hybrid Automatic Repeat reQuest) to the base station. Consequently, the UE in the idle state transitions to the RRC-connected state.

However, if the UE fails to detect the contention resolution message, the UE determines that a contention has occurred, reselects a preamble, and repeats the random access procedure for message 1 to message 4. When the base station detects that the contention has been resolved by the ACK from the UE, the base station transmits a UL grant to the UE. The UE initiates UL data using the UL resource allocated by the UL grant.

Figure 2:
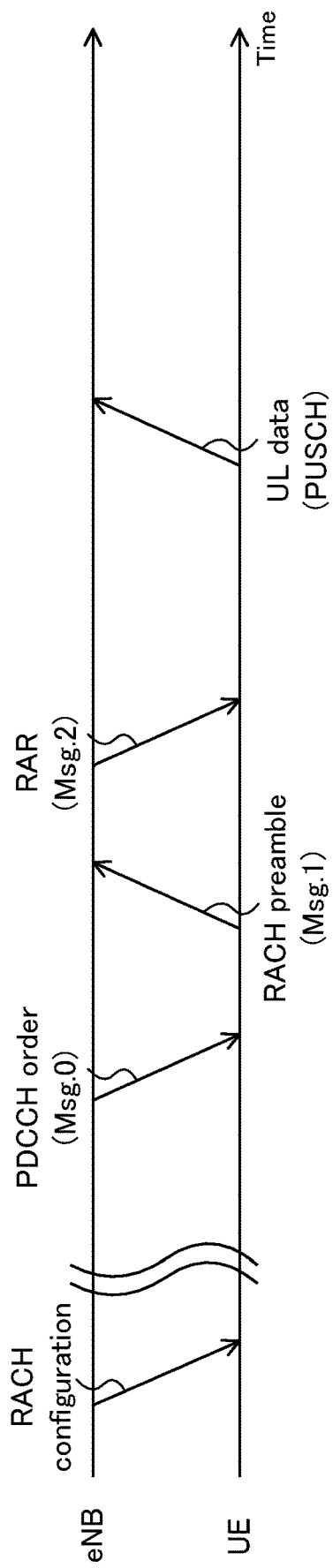
FIG. 2 is a diagram to show an example of a non-contention-based random access procedure.

FIG. 2 is a diagram to show an example of a non-contention-based random access. In the non-contention-based random access, the base station first transmits a physical downlink control channel (PDCCH-order) indicating the UE to transmit a PRACH (message 0). The UE transmits a random access preamble (PRACH) at the timing indicated by the PDCCH (message 1). Upon detection of the random access preamble, the base station transmits a random access response (RAR) which is the response information for the detected random access preamble (message 2).

The UE completes the non-contention-based random access processing upon receiving message 2. As with the contention-based random access, if the UE fails to receive message 2, the UE increases the transmission power of the PRACH and resends message 1. If the UE receives message 2, the UE may transmit the UL data (e.g., PUSCH) on the basis of the UL transmission indication (UL grant) included in message 2.

Figure 3:
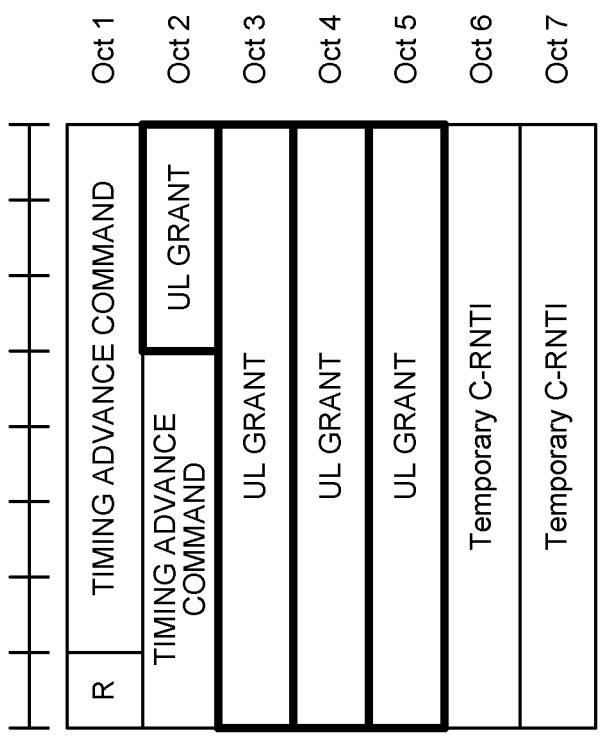
FIG. 3 is a diagram to show an example of an RAR notified by a MAC CE.

In the contention-based random access procedure and the non-contention-based random access procedure, the random access response (RAR) may include information indicating UL transmission (e.g., UL grant) (see FIG. 3). FIG. 3 shows an example of MAC control information (MAC RAR) corresponding to the RAR. The UE transmits an uplink shared channel (PUSCH) on the basis of a timing advance command, UL grant, and the like included in the RAR.

In the contention-based random access procedure, the PUSCH corresponding to message 3 is transmitted on the basis of the UL grant included in the RAR. In the non-contention-based random access procedure, the PUSCH is transmitted on the basis of the UL grant included in the RAR. The PUSCH may include a power headroom, a buffer status report, and so on.

<PTRS>

In the NR, the base station (e.g., gNB) transmits a phase tracking reference signal (PTRS) in the downlink. The base station may map the PTRS continuously or non-continuously in a time direction in, for example, one subcarrier, to transmit the PTRS. The base station may transmit the PTRS in at least a part of the time period (slot, symbol, or the like) during which the downlink shared channel (PDSCH) is transmitted. The PTRS transmitted by the base station may also be referred to as DL PTRS.

The UE transmits the phase tracking reference signal (PTRS) with the uplink. The UE may map the PTRS continuously or non-continuously in the time direction in, for example, one subcarrier, to transmit the PTRS. The UE may transmit the PTRS in at least a part of the time period (slot, symbol, or the like) during which the uplink shared channel (PUSCH: Physical Uplink Shared Channel) is transmitted. The PTRS transmitted by the UE may also be referred to as UL PTRS. Hereinafter, UL PTRS is simply referred to as PTRS.

The UE may determine whether or not the PTRS is present in the uplink (e.g., whether or not the PTRS is transmitted), on the basis of the configuration of the higher layer signaling (e.g., PTRS-UplinkConfig). In a case where the higher layer signaling relating to the PTRS (e.g., PTRS-UplinkConfig) is configured, the UE may assume that the PTRS exists in a resource block used for the PUSCH transmission. The base station may determine a phase noise on the basis of the PTRS to be transmitted from the UE, and correct the phase error of the received signal.

Here, the higher layer signaling may be, for example, any one or a combination of RRC (Radio Resource Control) signaling, MAC (Medium Access Control) signaling, broadcast information, and the like.

For example, the MAC signaling may use MAC control elements (MAC CE (Control Elements)), MAC PDU (Protocol Data Unit), and the like. The broadcast information may be, for example, master information blocks (MIB), system information blocks (SIB), minimum system information (RMSI (Remaining Minimum System Information)), other system information (OSI), and the like.

When the UE also transmits the PTRS in transmitting the PUSCH, the UE may perform control (e.g., rate matching) so that the resource to which the PTRS is mapped is not applied to the PUSCH transmission.

Even when the higher layer signaling relating to the PTRS (e.g., PTRS-UplinkConfig) is configured, the transmission of the PTRS may be controlled on the basis of the type or classification of the RNTI applied to the downlink control information (e.g., UL grant). For example, when the RNTI applied to the downlink control information (or CRC scramble of the DCI) is MCS-C-RNTI, C-RNTI, CS-RNTI, or SP-CSI-RNTI, the PTRS may be present in the PUSCH.

In this case, the UL grant included in the RAR (RAR UL grant) is not included in the aforementioned RNTI types because RA-RNTI is applied. Therefore, the PUSCH scheduled in the RAR UL grant basically does not include (is not present in) PTRS.

On the other hand, if the base station fails to perform reception processing (e.g., decoding) of the PUSCH scheduled in the RAR UL grant, the base station triggers or indicates the retransmission of the PUSCH. For example, in the non-contention-based random access, scheduling the retransmission using DCI CRC-scrambled with the C-RNTI can be taken into consideration.

In this case, if the PTRS is configured by the higher layer signaling (e.g., PTRS-UplinkConfig), it is assumed that the PTRS is present in the retransmission of the PUSCH (e.g., the UE also transmits the PTRS in transmitting the PUSCH). If the PTRS is not present in the initial transmission of the PUSCH, the size of the transport block may not be kept the same between the PUSCH transmitted initially and the PUSCH retransmitted.

The inventors of the present invention have examined how to control the transmission (or mapping) of the PTRS in at least one of the initial transmission of the PUSCH performed based on the RAR UL grant and the retransmission of the PUSCH.

Embodiments according to the present disclosure will be described hereinafter in detail with reference to the drawings. Note that the following first to fourth aspects may be used alone or in combination of at least two. In the following description, whether or not to transmit the PTRS and the presence/absence of PTRS may be read interchangeably.

The following describes an example of whether or not to transmit the PTRS when transmitting the PUSCH as indicated by the RAR UL grant in the non-contention-based (CFRA) random access procedure, but the present invention is not limited to this. The present disclosure may be applied to the PTRS transmitted at the time of PUSCH transmission indicated by the RAR UL grant in the contention-based (CBRA) random access procedure. Alternatively, the present disclosure may be applied to the PTRS at the time of the initial transmission and retransmission of the PUSCH (e.g., configured grant-based PUSCH) in a procedure other than the random access procedure.

Note that, in the present specification, retransmission (or resending) may refer only to the first transmission that is performed after the initial transmission, or to a plurality of retransmissions (a plurality of retransmissions after the first retransmission).

(First Aspect)

In the first aspect, in a case of transmitting an uplink shared channel (e.g., PUSCH) on the basis of a random access response (e.g., RAR), the presence/absence of a PTRS in this PUSCH is controlled so as to be common between the initial transmission of the PUSCH and the retransmission of the PUSCH.

That is, when the UE transmits (or maps) the PTRS in the PUSCH transmitted initially (initial transmission), the UE also transmits the PTRS in the PUSCH to be retransmitted (see FIG. 4A). On the other hand, when the UE does not transmit (or map) the PTRS in the PUSCH transmitted initially, the UE may control not to transmit the PTRS in the PUSCH to be retransmitted (see FIG. 4B).

For example, the UE may control the transmission of PTRS in PUSCH by utilizing at least one of options 1-1 to 1-3 below.

<Option 1-1>

The UE controls not to transmit (or map) the PTRS in the initial transmission of the PUSCH and not to transmit the PTRS in the retransmission of the PUSCH (see FIG. 4A). When the PTRS is configured by the higher layer signaling, the UE may control not to transmit the PTRS by ignoring the configuration of the higher layer signaling.

By transmitting the PTRS in each of the initial transmission and the retransmission of the PUSCH, it becomes easy to control the transport block size (TBS) for the initial transmission and the retransmission in the same manner.

<Option 1-2>

The UE controls to transmit (or map) the PTRS in the initial transmission of the PUSCH and to transmit the PTRS in the retransmission of the PUSCH (see FIG. 4A).

Option 1-2 may be applied if the PTRS is configured by the higher layer signaling (e.g., UE-specific parameter). Option 1-1 may be applied if the PTRS is not configured by the higher layer signaling.

Alternatively, option 1-2 may be applied even if the PTRS is not configured by the higher layer signaling. In this case, the UE may ignore the presence/absence of the configuration of the higher layer signaling to transmit the PTRS.

Alternatively, the PTRS corresponding to the initial transmission and the PTRS corresponding to the retransmission may be configured by separate forms of higher layer signaling. In this case, if the PTRS corresponding to the initial transmission is configured, option 1-2 may be applied regardless of whether or not the PTRS corresponding to the retransmission is configured (e.g., even if the PTRS is not configured).

By transmitting the PTRS in each of the initial transmission and retransmission of the PUSCH, it becomes easy to control the transport block size for the initial transmission and the retransmission in the same manner. In both the initial transmission and the retransmission, the base station can determine a phase noise on the basis of the PTRS transmitted from the UE, and correct the phase error of the received signal.

<Option 1-3>

The UE may control to transmit (or map) the PTRS in the initial transmission and retransmission of the PUSCH, regardless of whether or not the PTRS is configured by the higher layer signaling (UE-specific parameter).

In such a case, the UE may transmit the PTRS by applying a certain value (e.g., a default value) as a parameter of the PTRS configuration. The parameter of the PTRS configuration may be at least one of time density and frequency density.

For example, if a higher layer parameter relating to the time density (timeDensity) is not notified or if the field for timeDensity does not exist, the UE may apply a certain time density (e.g., L_PT-RS=1). Alternatively, the UE may apply a certain frequency density (e.g., K_PT-RS=2) if a higher layer parameter relating to frequency density (frequencyDensity) is not notified or if the field for frequencyDensity does not exist.

The UE may apply the parameters of a certain PTRS configuration only when the PTRS is not configured by the higher layer signaling, or may apply a parameter of a certain PTRS configuration even if the PTRS is configured by the higher layer signaling.

In this manner, by controlling the transmission of the PTRS in the initial transmission and retransmission of the PUSCH regardless of whether or not the PTRS is configured by the higher layer parameter, the transmission of the PTRS in the PUSCH scheduled by the RAR UL grant can be appropriately controlled.

<Variations>

The UE may determine whether to include the PTRS in the retransmission, on the basis of whether the PTRS is configured by higher layer signaling and whether the PTRS is included in the initial transmission (or the previous retransmission) regardless of the RNTI type.

(Second Aspect)

In the second aspect, in a case of transmitting the uplink shared channel on the basis of a random access response, the presence/absence of the PTRS in this PUSCH is controlled separately (e.g., differently) with respect to the initial transmission of the PUSCH and the retransmission of the PUSCH.

That is, the UE controls the transmission (or mapping) of the PTRS in the initial transmission of the PUSCH and the transmission of the PTRS in the retransmission (re-transmission) of the PUSCH, independently.

For example, the UE may control the transmission of the PTRS in the PUSCH by utilizing at least one of the following options 2-1 to 2-4.

<Option 2-1>

The UE controls not to transmit (or map) the PTRS in the initial transmission of the PUSCH. The UE may control not to transmit the PTRS regardless of whether or not the PTRS is configured by the higher layer signaling.

Figure 5A:
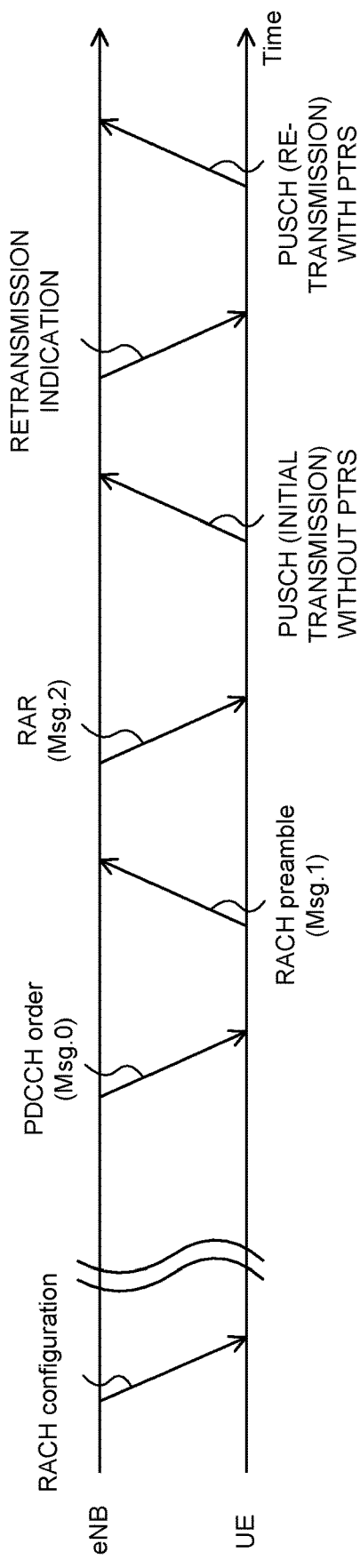
FIGS. 5A and 5B are each a diagram to show another example of the transmission control for a PUSCH according to a second aspect.

On the other hand, the UE may control whether or not to transmit the PTRS in the retransmission of the PUSCH regardless of whether or not the PTRS is configured by the higher layer signaling. For example, when the PTRS is configured by the higher layer signaling, the UE controls to transmit the PTRS in the retransmission of the PUSCH (see FIG. 5A).

Alternatively, the UE may control to transmit the PTRS in the retransmission of the PUSCH even if the PTRS is not configured by the higher layer signaling. In this case, the UE may ignore that the PTRS is not configured by the higher layer signaling, to transmit the PTRS.

In this manner, with the configuration in which the PTRS is not transmitted in the initial transmission of the PUSCH and the PTRS is transmitted in the retransmission of the PUSCH, the phase noise correction can be appropriately performed by using the PTRS in the retransmission of the PUSCH. As a result, a decrease in the error rate of the retransmission of the PUSCH can be expected.

<Option 2-2>

The UE may control whether or not to transmit the PTRS in the initial transmission of the PUSCH on the basis of whether or not the PTRS is configured by the higher layer signaling. For example, if the PTRS is configured by the higher layer signaling, the UE controls to transmit the PTRS in the retransmission of the PUSCH.

Figure 5B:
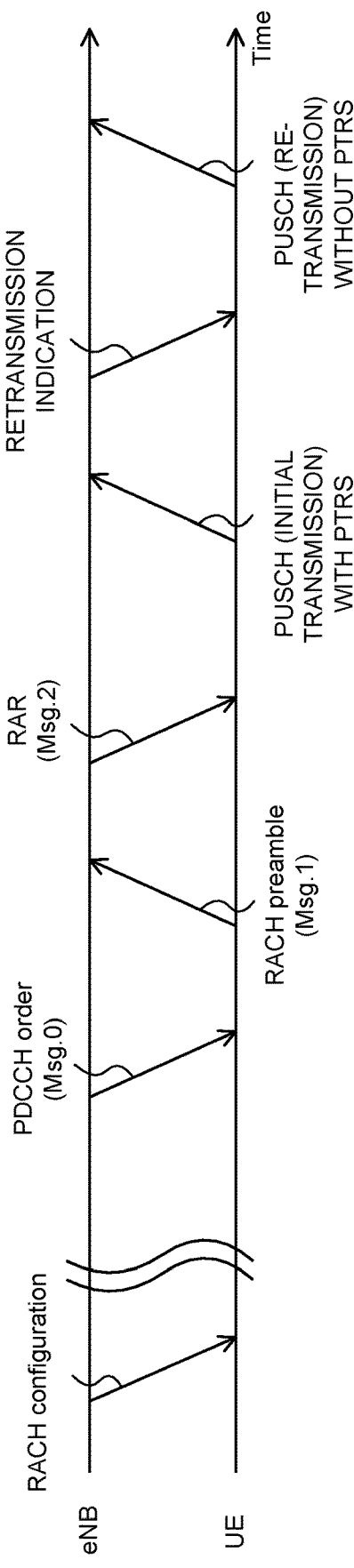

On the other hand, the UE may control not to transmit the PTRS in the retransmission of the PUSCH, regardless of whether or not the PTRS is configured by the higher layer signaling (see FIG. 5B). For example, if the PTRS is configured by the higher layer signaling, the UE may ignore whether or not the higher layer signaling is configured, not to transmit the PTRS.

Thus, with the configuration in which the PTRS is transmitted in the initial transmission of the PUSCH, and the PTRS is not transmitted in the retransmission of the PUSCH, the error rate of the retransmission of the PUSCH can be reduced in reducing the data coding rate and retransmitting the PUSCH. On the other hand, when the data coding rate is made equal to that of the initial transmission to transmit the data, the resource used by the retransmitted PUSCH can be made smaller than that of the initial transmission, and the frequency utilization efficiency of the retransmitted PUSCH can be expected to improve.

<Option 2-3>

The UE may separately control whether or not to transmit the PTRS in the initial transmission of the PUSCH and whether or not to transmit the PTRS in the retransmission of the PUSCH, regardless of whether or not the PTRS is configured by the higher layer signaling (UE-specific parameter).

For example, the UE may control to transmit the PTRS in the initial transmission of the PUSCH and not to transmit the PTRS in the retransmission of the PUSCH, regardless of whether or not the PTRS is configured by the higher layer signaling (UE-specific parameter).

A certain value (for example, a default value) may be applied to the parameter of the PTRS configuration applied to the transmission of the PTRS in the initial transmission of the PUSCH. The method illustrated in option 1-3 above may be applied to the parameters of the PTRS configuration applied to the transmission of the PTRS.

<Option 2-4>

The UE may separately control whether or not to transmit the PTRS in the initial transmission of the PUSCH and whether or not to transmit the PTRS in the retransmission of the PUSCH, regardless of whether or not the PTRS is configured by the higher layer signaling (UE-specific parameter).

For example, the UE may control not to transmit the PTRS in the initial transmission of the PUSCH and to transmit the PTRS in the retransmission of the PUSCH, regardless of whether or not the PTRS is configured by the higher layer signaling (UE-specific parameter).

A certain value (for example, a default value) may be applied to the parameters of the PTRS configuration applied to the transmission of the PTRS in the retransmission of the PUSCH. The method illustrated in option 1-3 above may be applied to the parameters of the PTRS configuration applied to the transmission of the PTRS.

In this manner, by separately controlling whether or not to transmit the PTRS in the initial transmission and the retransmission of the PUSCH regardless of whether or not the PTRS is configured by the higher layer parameter, the phase noise correction effect and the error rate reduction effect that are achieved by inserting the PTRS, and the effect of reducing the data coding rate by not inserting the PTRS or the effect of reducing the resources used by the PUSCH, can be appropriately controlled in each of the initial transmission and the retransmission. As a result, control to improve network utilization efficiency and communication quality can be performed more flexibly and appropriately.

(Third Aspect)

In the third aspect, when the uplink shared channel is transmitted on the basis of the random access response, the UE autonomously determines the presence/absence of the PTRS in at least one of the initial transmission of the PUSCH and the retransmission of the PUSCH (UE implementation).

For example, the UE may control the transmission of PTRS in the PUSCH by utilizing at least one of options 3-1 to 3-5 below.

<Option 3-1>

The UE controls not to transmit (or map) the PTRS in the initial transmission of the PUSCH. The UE may control not to transmit the PTRS regardless of whether or not the PTRS is configured by the higher layer signaling.

On the other hand, the UE may autonomously determine whether or not to transmit the PTRS in the retransmission of the PUSCH.

<Option 3-2>

The UE may control whether or not to transmit the PTRS in the initial transmission of the PUSCH on the basis of whether or not the PTRS is configured by the higher layer signaling. For example, if the PTRS is configured by the higher layer signaling, the UE controls to transmit the PTRS in the initial transmission of the PUSCH.

On the other hand, the UE may autonomously determine whether or not to transmit the PTRS in the retransmission of the PUSCH (UE implementation).

<Option 3-3>

The UE may autonomously determine whether or not to transmit the PTRS in the initial transmission of the PUSCH.

On the other hand, the UE controls not to transmit (or map) the PTRS in the retransmission of the PUSCH. The UE may control not to transmit the PTRS regardless of whether or not the PTRS is configured by the higher layer signaling.

<Option 3-4>

The UE may autonomously determine whether or not to transmit the PTRS in the initial transmission of the PUSCH.

On the other hand, the UE may control whether or not to transmit the PTRS in the retransmission of the PUSCH, regardless of whether or not the PTRS is configured by the higher layer signaling. For example, if the PTRS is configured by the higher layer signaling, the UE controls to transmit the PTRS in the retransmission of the PUSCH.

<Option 3-5>

The UE may autonomously determine whether or not to transmit the PTRS in the initial transmission of the PUSCH and the retransmission of the PUSCH.

In this manner, with the configuration in which the UE autonomously determines whether or not to transmit the PTRS, the PUSCH transmission on the RAR UL grant can be appropriately performed even when there is no PTRS configuration indication from the base station.

(Fourth Aspect)

The fourth aspect describes the transport block size (TBS) applied in the initial transmission and retransmission of the PUSCH. The fourth aspect is suitably applicable when the transmission of the PTRS is applied to only either the initial transmission or the retransmission (e.g., the second aspect). Needless to say, the configuration to which the fourth aspect is applicable is not limited thereto.

In NR, at least one of the modulation scheme (or modulation order) and the coding rate for the PUSCH scheduled by the downlink control information (DCI) is controlled on the basis of a certain field (e.g., a modulation and coding scheme (MCS) field) included in the DCI (e.g., UL grant).

Specifically, under investigation is that the UE uses a table (MCS table) that associates an MCS index, a modulation order, and a TBS index, to determine, for the PUSCH, the modulation order/coding rate corresponding to the MCS index shown by the MCS field in the DCI.

Here, each modulation order is a value corresponding to each modulation scheme. For example, the modulation orders of QPSK (Quadrature Phase Shift Keying), 16QAM (Quadrature Amplitude Modulation), 64QAM, and 256QAM are 2, 4, 6, and 8, respectively.

FIG. 6 is a diagram to show an example of the MCS table. Note that the values in the MCS table shown in FIG. 6 are merely examples, and are not limited thereto. Some items associated with the MCS index (IMCS) (e.g., spectral efficiency) may be omitted or other items may be added.

FIG. 6 shows an example of a table to be applied when transform precoding is enabled and the MCS table information does not indicate 256QAM. Note that a table to be applied when transform precoding is disabled and a table to be applied when transform precoding is enabled and the MCS table information indicates 256QAM may be defined separately.

The UE may use the table of FIG. 6 to determine the modulation order/coding rate corresponding to the MCS index (IMCS) in the DCI. Note that, for example, in FIG. 6, if the UE satisfies particular conditions (e.g., BPSK support), a modulation order q corresponding to a particular MCS index (e.g., 0, 1) may be 1 (BPSK). If the particular conditions described above are not satisfied, the modulation order q may be 2 (QPSK).

In this manner, the UE determines the modulation scheme applied to the PUSCH (initial transmission or retransmission) on the basis of the MCS index included in the UL grant.

In the table of FIG. 6, MCS index 28 to MCS index 31 correspond to a reserved bit. In the fourth aspect, the reserved bit is used to notify the transport block size (TBS) applied to the PUSCH.

For example, when the MCS field included in the DCI (e.g., UL grant) indicating the retransmission of the PUSCH indicates a certain MCS index, the UE applies the TBS applied in the initial transmission (or the previous retransmission) in the retransmission of the PUSCH. That is, when any of MCS index 28 and MCS index 31 is specified by the MCS field, the UE controls so that the TBS is the same in the initial transmission and the retransmission.

Here, although it is assumed that the certain MCS index is at least one of MCS index 28 to MCS index 31 corresponding to the reserved bits, the value of the certain MCS index is not limited thereto.

In this manner, by specifying the TBS by using the bit of a certain field included in the downlink control information (e.g., UL grant) indicating the retransmission, the TBS can be the same in the initial transmission and retransmission of the PUSCH even when the PTRS is included in only either the initial transmission or the retransmission.

(Variations)

For NR, performing a random access procedure by using fewer steps than the existing four steps is considered. For example, there is a random access procedure using two steps. The random access procedure using two steps is also called a two-step random access procedure, two-step RACH, or 2-step RACH. The first to fourth aspects above may be applied in a two-step RACH.

Figure 7:
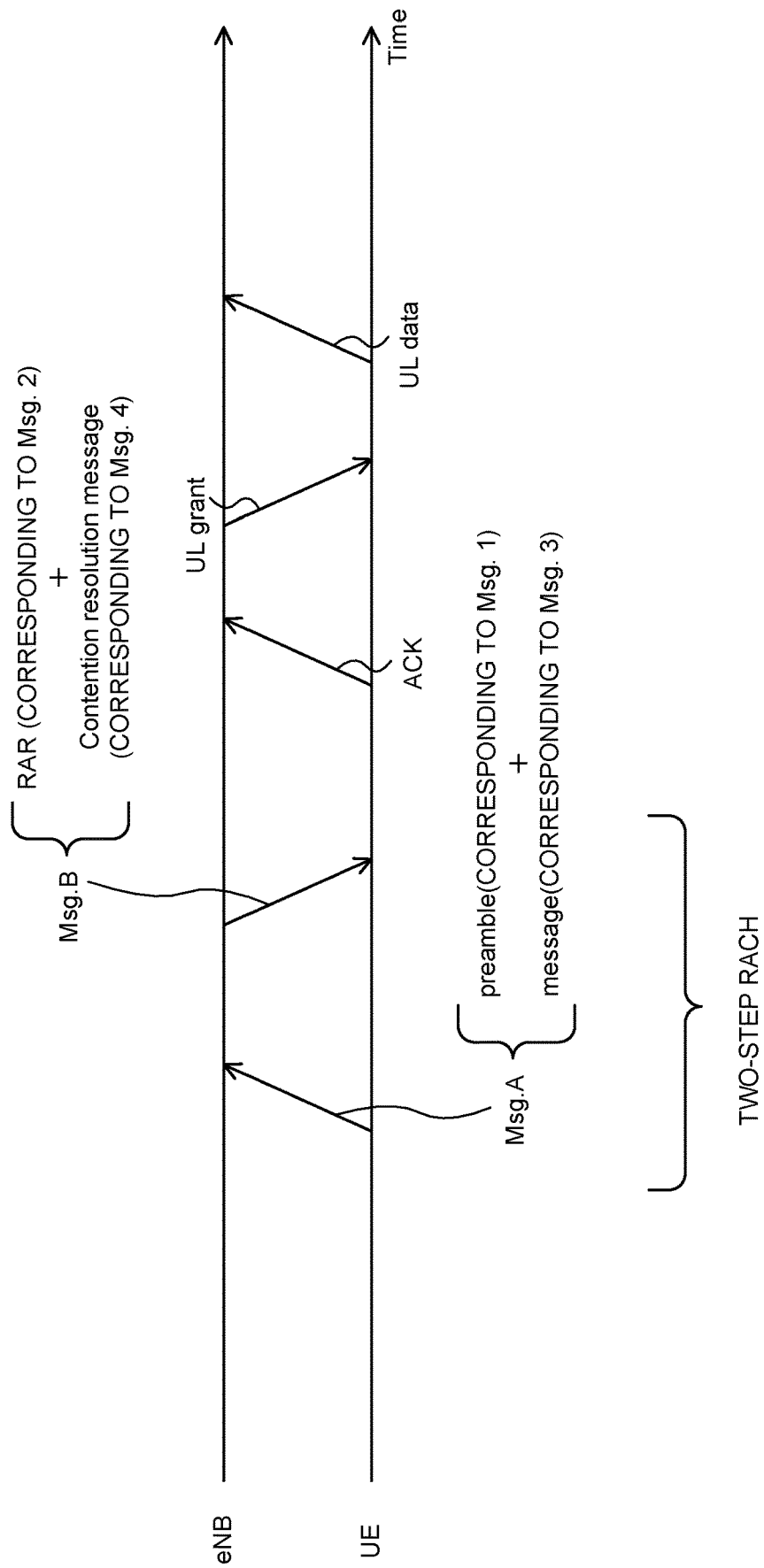
FIG. 7 is a diagram to show an example of a two-step random access procedure.

An example of the 2-step RACH is shown in FIG. 7. The 2-step RACH may be composed of a first step of transmission from the UE to the base station and a second step of transmission from the base station to the UE.

For example, in the first step, at least one of the UL signal and the UL channel (also described as UL signal/UL channel, hereinafter) including a preamble and a message may be transmitted from the UE to the base station. The preamble may be configured to play a role similar to that of message 1 (PRACH) in the existing random access procedure. The message may be configured to play a role similar to that of message 3 (PUSCH) in the existing random access procedure. Note that the preamble and message transmitted in the first step may be referred to as a message A (Msg. A) or a first message.

In the second step, at least one of the DL signal and the DL channel also (described as DL signal/DL channel, hereinafter) including a response and a contention-resolution may be transmitted from the base station to the UE. The response may be configured to play a role similar to that of message 2 (random access response (RAR) transmitted on the PDSCH) in the existing random access procedure. The contention-resolution may be configured to play a role similar to that of message 4 (PDSCH) in the existing random access procedure. Note that the message transmitted in the second step may be referred to as a message B (Msg. B) or a second message.

Figure 8:
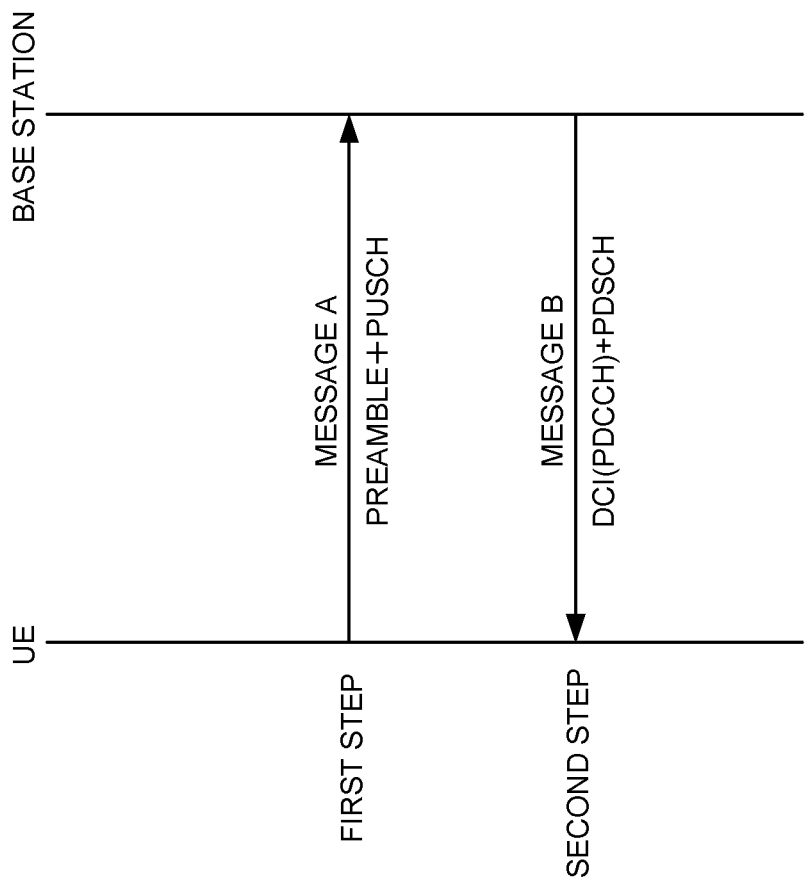
FIG. 8 is a diagram to show another example of the two-step random access procedure.

In the 2-step RACH, for example, it is assumed that the message (corresponding to existing message 3) is transmitted in the first step by using the uplink shared channel (e.g., PUSCH) (see FIG. 8). In such a case, at least one of the first to fourth aspects may be applied to the initial transmission and retransmission of the PUSCH included in the message A.

(Radio Communication System)

Hereinafter, a structure of a radio communication system according to one embodiment of the present disclosure will be described. In this radio communication system, the radio communication method according to each embodiment of the present disclosure described above may be used alone or may be used in combination for communication.

Figure 9:
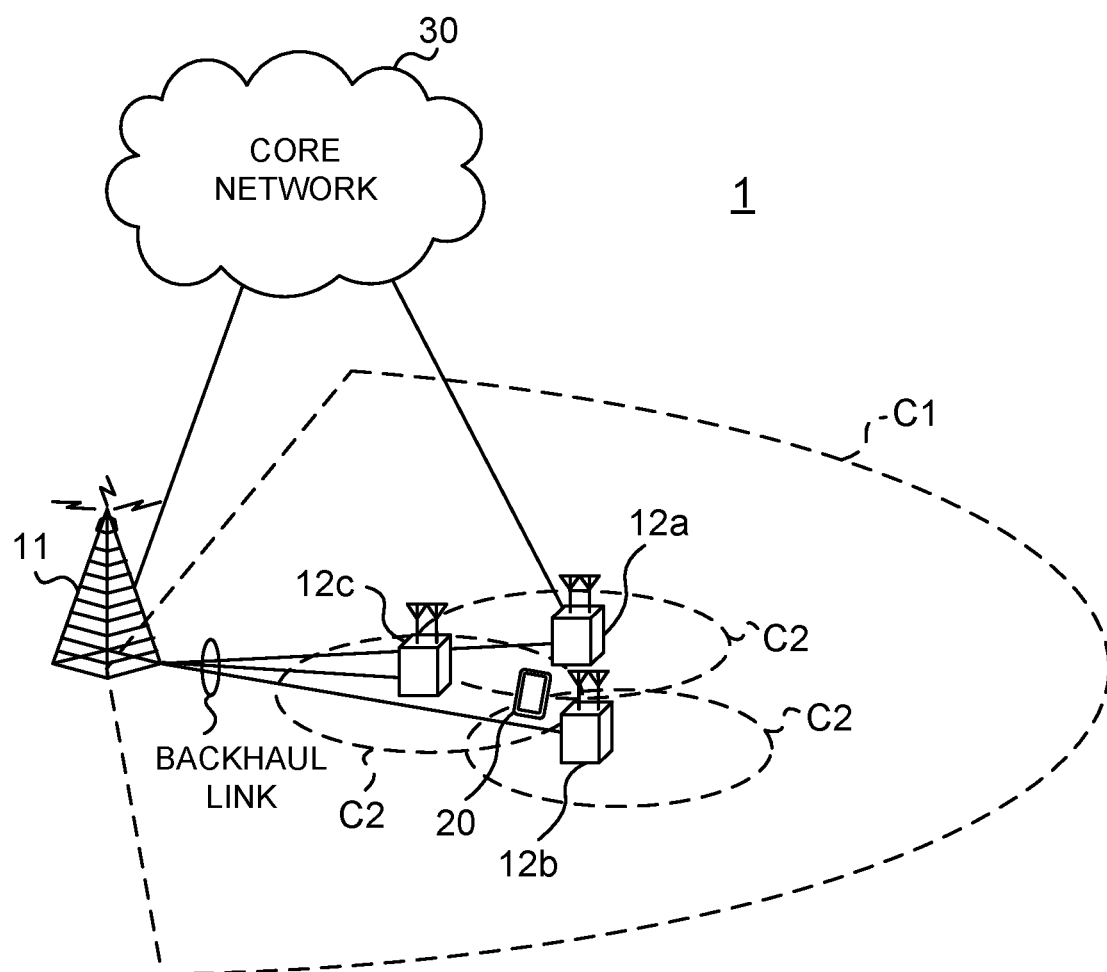
FIG. 9 is a diagram to show an example of a schematic structure of a radio communication system according to one embodiment.

FIG. 9 is a diagram to show an example of a schematic structure of the radio communication system according to one embodiment. The radio communication system 1 may be a system implementing a communication using Long Term Evolution (LTE), 5th generation mobile communication system New Radio (5G NR) and so on the specifications of which have been drafted by Third Generation Partnership Project (3GPP).

The radio communication system 1 may support dual connectivity (multi-RAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell C1 of a relatively wide coverage, and base stations 12 (12a to 12c) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation (CA) and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHz), and FR2 may be a frequency band which is higher than 24 GHz (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber in compliance with the Common Public Radio Interface (CPRI), the X2 interface and so on) or a wireless connection (for example, an NR communication). For example, if an NR communication is used as a backhaul between the base stations 11 and 12, the base station 11 corresponding to a higher station may be referred to as an "Integrated Access Backhaul (IAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (5GCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are communicated on the PDSCH. User data, higher layer control information and so on may be communicated on the PUSCH. The Master Information Blocks (MIBs) may be communicated on the PBCH.

Lower layer control information may be communicated on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data", and the PUSCH may be interpreted as "UL data".

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a certain search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be communicated by means of the PUCCH. By means of the PRACH, random access preambles for establishing connections with cells may be communicated.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be communicated. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on may be communicated as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a sounding reference signal (SRS), a demodulation reference signal (DMRS), and so on may be communicated as an uplink reference signal (UL-RS). Note that DMRS may be referred to as a "user terminal specific reference signal (UE-specific Reference Signal)."

(Base Station)

Figure 10:
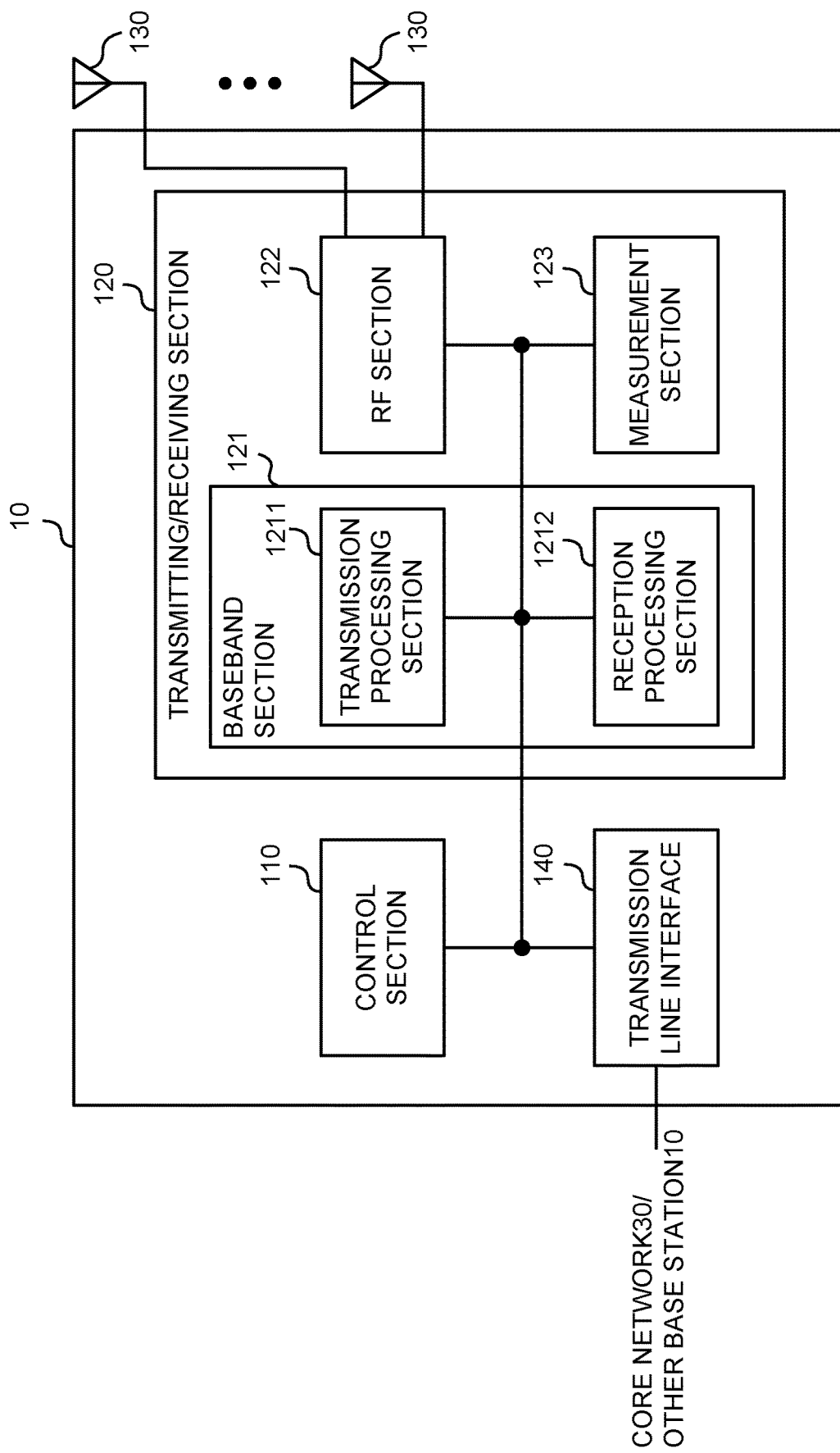
FIG. 10 is a diagram to show an example of a structure of a base station according to one embodiment.

FIG. 10 is a diagram to show an example of a structure of the base station according to one embodiment. The base station 10 includes a control section 110, a transmitting/receiving section 120, transmitting/receiving antennas 130 and a communication path interface (transmission line interface) 140. Note that the base station 10 may include one or more control sections 110, one or more transmitting/receiving sections 120, one or more transmitting/receiving antennas 130, and one or more communication path interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the communication path interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmit beam and a receive beam by using digital beam forming (for example, precoding), analog beam forming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data and control information and so on acquired from the control section 110, and may generate bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RRM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The communication path interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120, the transmitting/receiving antennas 130, and the communication path interface 140.

Note that the transmitting/receiving section 120 may transmit control information (e.g., PDCCH-order) indicating the transmission of a random access preamble. The transmitting/receiving section 120 may transmit a response signal corresponding to the random access preamble. The transmitting/receiving section 120 may transmit information on the configuration of the PTRS (e.g., higher layer signaling).

The control section 110 may control the reception on the assumption that whether or not to transmit the phase tracking reference signal (PTRS) in the initial transmission and whether or not to transmit the PTRS in the retransmission are configured in common. Alternatively, the control section 110 may control the reception on the assumption that whether or not to transmit the phase tracking reference signal (PTRS) in the initial transmission and whether or not to transmit the PTRS in the retransmission are configured independently (e.g., differently).

The control section 110 may make specification in the downlink control information so that the same transport block size is applied to the initial transmission and the retransmission of the PUSCH.

(User Terminal)

Figure 11:
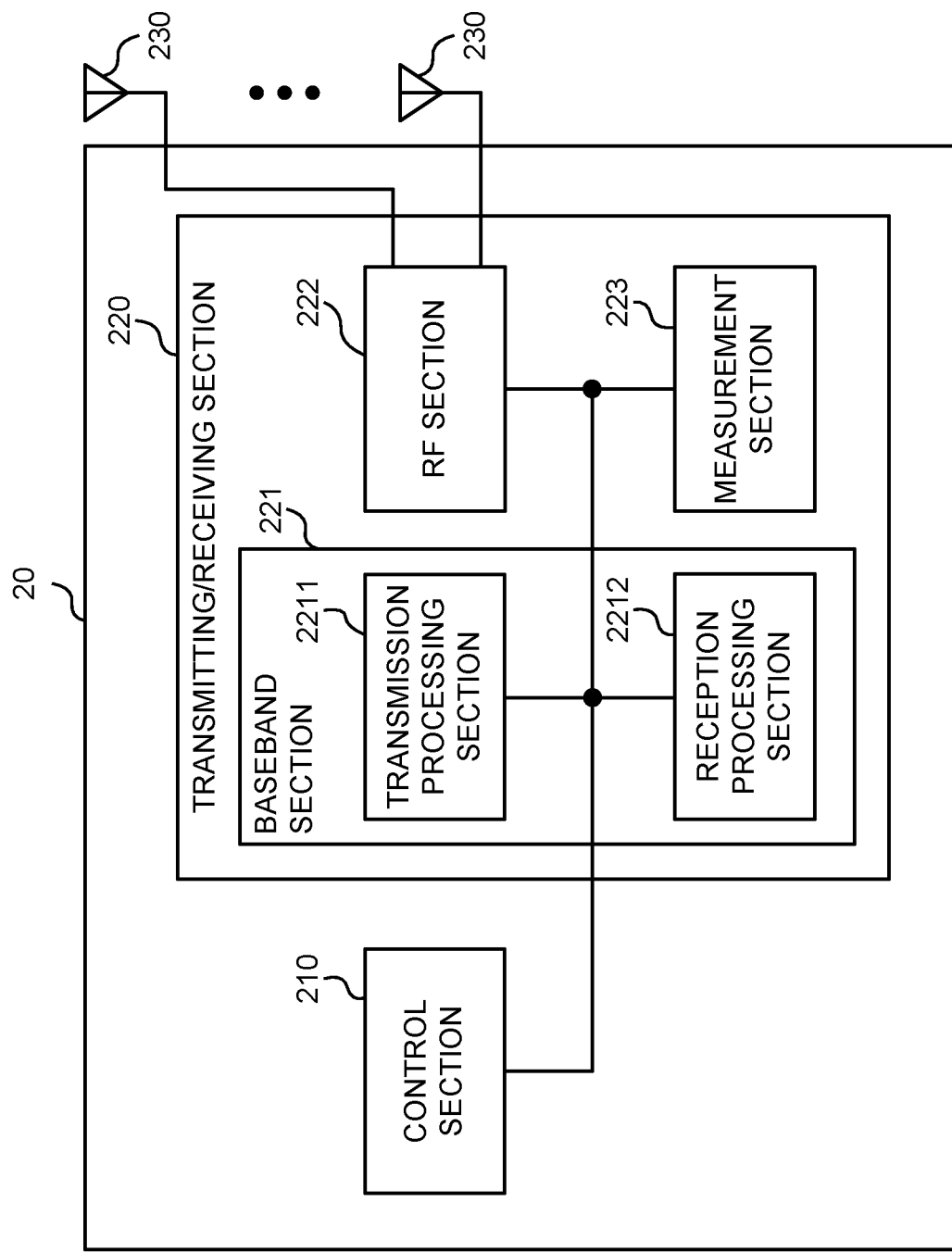
FIG. 11 is a diagram to show an example of a structure of a user terminal according to one embodiment.

FIG. 11 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may be constituted with a transmitting section and a receiving section. The transmitting section may be constituted with the transmission processing section 2211 and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmit beam and a receive beam by using digital beam forming (for example, precoding), analog beam forming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a certain channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220 and the transmitting/receiving antennas 230.

Note that the transmitting/receiving section 220 may receive control information (e.g., PDCCH-order) indicating the transmission of a random access preamble. The transmitting/receiving section 120 may transmit the random access preamble. The transmitting/receiving section 120 may receive a response signal corresponding to the random access preamble. The transmitting/receiving section 120 may receive information on the configuration of the PTRS (e.g., higher layer signaling).

In a case of transmitting the uplink shared channel on the basis of the response signal, the control section 210 may perform control so that whether or not to transmit the phase tracking reference signal (PTRS) in the initial transmission and whether or not to transmit the PTRS in the retransmission are common. Even when the information on the configuration of the PTRS is received, the control section 210 may control whether or not to transmit the PTRS in the initial transmission and the retransmission, regardless of the information.

Alternatively, in a case of transmitting the uplink shared channel on the basis of the response signal, the control section 210 may separately control whether or not to transmit the phase tracking reference signal (PTRS) in the initial transmission and whether or not to transmit the PTRS in the retransmission. Even when the information on the configuration of the PTRS is received, the control section 210 may control to transmit the PTRS in either one of the initial transmission and the retransmission and not to transmit the PTRS in the other, regardless of the information.

When the index of the modulation and coding scheme included in the downlink control information scheduling retransmission of the uplink shared channel is a certain value, the control section 210 may apply the same transport block size as the initial transmission, to perform the retransmission.

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 12:
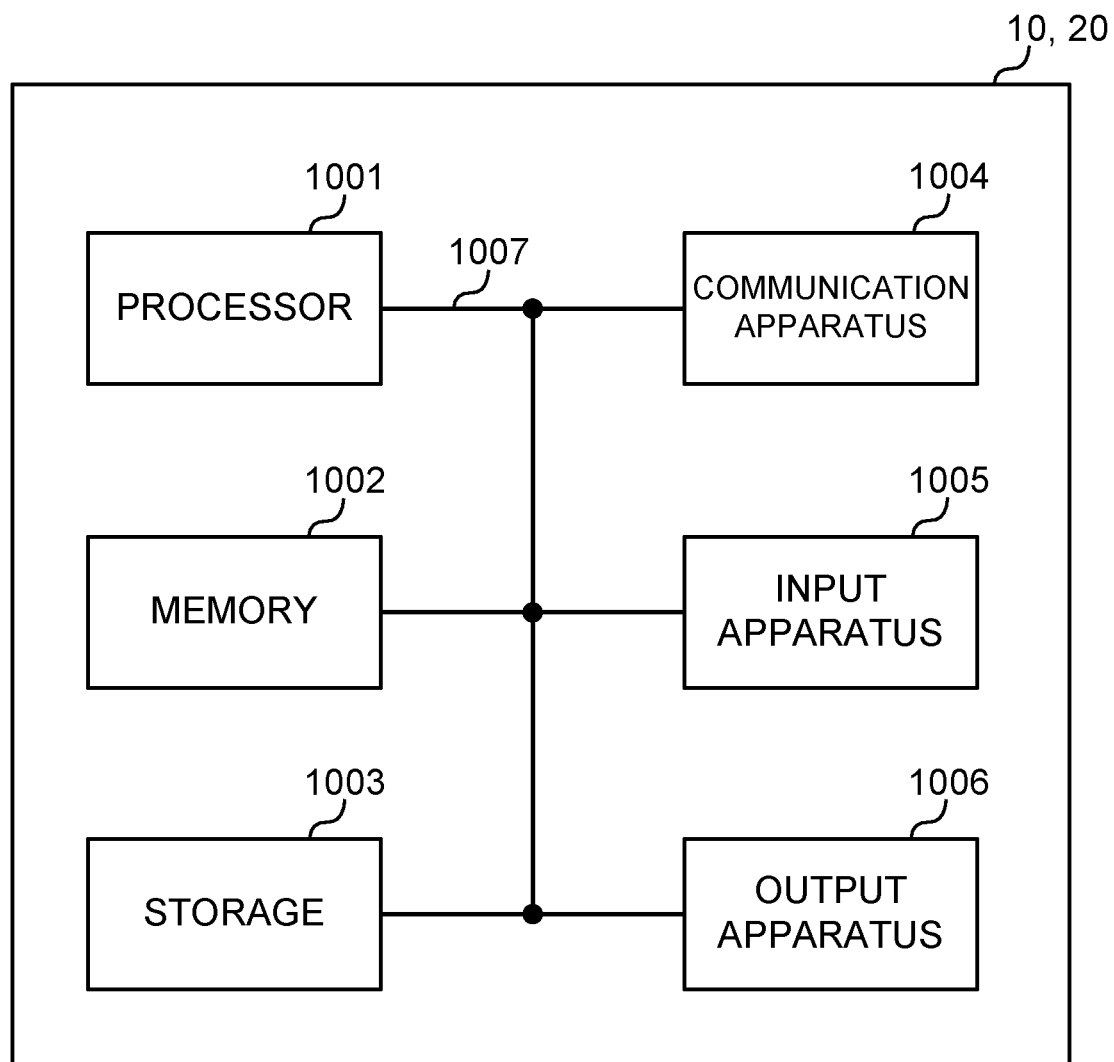
FIG. 12 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 12 is a diagram to show an example of a hardware structure of the base station and the user terminal according to one embodiment. Physically, the above-described base station 10 and user terminal 20 may each be formed as a computer apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing certain software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAM), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120a (220a) and the receiving section 120b (220b) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

(Variations)

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a certain signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (Physical RB (PRB))," a "subcarrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for certain numerology in a certain carrier. Here, a common RB may be specified by an index of the RB based on the common reference point of the carrier. A PRB may be defined by a certain BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE does not need to assume to transmit/receive a certain signal/channel outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to certain values, or may be represented in another corresponding information. For example, radio resources may be specified by certain indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety of different technologies. For example, data, indications, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information in the present disclosure may be implemented by using physical layer signaling (for example, downlink control information (DCI), uplink control information (UCI), higher layer signaling (for example, Radio Resource Control (RRC) signaling, broadcast information (master information block (MIB), system information blocks (SIBs), and so on), Medium Access Control (MAC) signaling and so on), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be reported using, for example, MAC control elements (MAC CEs).

Also, reporting of certain information (for example, reporting of "X holds") does not necessarily have to be reported explicitly, and can be reported implicitly (by, for example, not reporting this certain information or reporting another piece of information).

Determinations may be made in values represented by one bit (0 or 1), may be made in Boolean values that represent true or false, or may be made by comparing numerical values (for example, comparison against a certain value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure can be used interchangeably. The "network" may mean an apparatus (for example, a base station) included in the network.

In the present disclosure, the terms such as "precoding," a "precoder," a "weight (precoding weight)," "quasi-co-location (QCL)," a "Transmission Configuration Indication state (TCI state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be device mounted on a mobile body or a mobile body itself, and so on. The mobile body may be a vehicle (for example, a car, an airplane, and the like), may be a mobile body which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IoT) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink" and "downlink" may be interpreted as the words corresponding to the terminal-to-terminal communication (for example, "side"). For example, an uplink channel, a downlink channel and so on may be interpreted as a side channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), Future Radio Access (FRA), New-Radio Access Technology (RAT), New Radio (NR), New radio access (NX), Future generation radio access (FX), Global System for Mobile communications (GSM (registered trademark)), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

What is claimed is:

1. A terminal comprising:
    a receiver that receives a random access response (RAR) corresponding to a random access preamble;
    a transmitter that transmits an uplink shared channel based on an uplink (UL) transmission indication included in the RAR; and
    a processor that controls to not perform, in contention-based random access, a transmission of a phase tracking reference signal (PTRS) in a transmission of the uplink shared channel, and controls to not perform a transmission of a PTRS in a retransmission of the uplink shared channel,
    wherein the retransmission of the uplink shared channel is a retransmission of a message after receiving the RAR,
    the processor does not perform, in contention-free random access, a transmission of a PTRS in a transmission of an uplink shared channel scheduled by a UL grant included in an RAR (RAR UL grant), and
    the processor supports, in the contention-free random access, a transmission of a PTRS in a retransmission of the uplink shared channel scheduled using downlink control information (DCI) with cyclic redundancy check (CRC) scrambled by cell-radio network temporary identifier (C-RNTI).

2. A radio communication method for a terminal, comprising:
    receiving a random access response (RAR) corresponding to a random access preamble;
    transmitting an uplink shared channel based on an uplink (UL) transmission indication included in the RAR; and
    controlling to not perform, in contention-based random access, a transmission of a phase tracking reference signal (PTRS) in a transmission of the uplink shared channel, and controlling to not perform a transmission of a PTRS in a retransmission of the uplink shared channel,
    wherein the retransmission of the uplink shared channel is a retransmission of a message after receiving the RAR,
    the terminal does not perform, in contention-free random access, a transmission of a PTRS in a transmission of an uplink shared channel scheduled by a UL grant included in an RAR (RAR UL grant), and
    the terminal supports, in the contention-free random access, a transmission of a PTRS in a retransmission of the uplink shared channel scheduled using downlink control information (DCI) with cyclic redundancy check (CRC) scrambled by cell-radio network temporary identifier (C-RNTI).

3. A base station comprising:
    a transmitter that transmits a random access response (RAR) corresponding to a random access preamble; and
    a receiver that receives an uplink shared channel based on an uplink (UL) transmission indication included in the RAR,
    wherein the receiver does not receive, in contention-based random access, a phase tracking reference signal (PTRS) in a transmission of the uplink shared channel and a retransmission of the uplink shared channel,
    wherein the retransmission of the uplink shared channel is a retransmission of a message after receiving the RAR,
    the receiver does not receive, in contention-free random access, a PTRS in a transmission of an uplink shared channel scheduled by a UL grant included in an RAR (RAR UL grant), and
    the base station supports, in the contention-free random access, a transmission of a PTRS, by a terminal, in a retransmission of the uplink shared channel scheduled using downlink control information (DCI) with cyclic redundancy check (CRC) scrambled by cell-radio network temporary identifier (C-RNTI).

4. A system comprising a terminal and a base station, wherein the terminal comprises:
    a receiver that receives a random access response (RAR) corresponding to a random access preamble;
    a transmitter that transmits an uplink shared channel based on an uplink (UL) transmission indication included in the RAR; and
    a processor that controls to not perform, in contention-based random access, a transmission of a phase tracking reference signal (PTRS) in a transmission of the uplink shared channel, and controls to not perform a transmission of a PTRS in a retransmission of the uplink shared channel,
    wherein the retransmission of the uplink shared channel is a retransmission of a message after receiving the RAR,
    the processor does not perform, in contention-free random access, a transmission of a PTRS in a transmission of an uplink shared channel scheduled by a UL grant included in an RAR (RAR UL grant), and
    the processor supports, in the contention-free random access, a transmission of a PTRS in a retransmission of the uplink shared channel scheduled using downlink control information (DCI) with cyclic redundancy check (CRC) scrambled by cell-radio network temporary identifier (C-RNTI), and
    the base station comprises:
    a transmitter that transmits the RAR corresponding to the random access preamble; and
    a receiver that receives the uplink shared channel which is transmitted based on the UL transmission indication included in the RAR.

* * * * *